United States Patent [19]

Gleinig

[11] 4,075,198

[45] Feb. 21, 1978

[54] PROCESS FOR MANUFACTURE OF BENZIDINE PIGMENTS

[75] Inventor: Harald E. K. Gleinig, Bechen, Neschen, Germany

[73] Assignee: Colour-Chem Ltd., India

[21] Appl. No.: 618,886

[22] Filed: Oct. 2, 1975

[51] Int. Cl.$^2$ .................. C07C 109/04; C07C 109/06; C09B 35/10; C09B 35/18

[52] U.S. Cl. .............................. 260/161; 106/288 Q; 260/143; 260/176; 260/182; 260/510; 260/518 R; 260/569

[58] Field of Search ................... 260/569, 510, 518 R, 260/143, 161, 176, 182

[56] References Cited

U.S. PATENT DOCUMENTS

| | | | |
|---|---|---|---|
| 1,998,488 | 4/1935 | Calcott et al. | 260/569 |
| 2,570,866 | 10/1951 | Sargent et al. | 260/569 X |
| 2,600,000 | 6/1952 | Kamlet | 260/569 |
| 2,640,081 | 5/1953 | Farkas et al. | 260/578 |
| 2,765,301 | 10/1956 | Cashion | 260/205 |
| 2,966,519 | 12/1960 | Cashion | 260/571 |
| 3,821,190 | 6/1974 | Buckwalter | 260/143 |
| 3,917,701 | 11/1975 | Cousino | 260/569 |

OTHER PUBLICATIONS

Hashimoto et al. (I), Chemical Abstracts, vol. 60, 437b–c (1964).

Hashimoto et al. (II), Chemical Abstracts, vol. 62, 3960–3961 (1965).

Hashimoto et al. (III), Chemical Abstracts, vol. 66, #'s 64835w and 64836x, (1967).

*Primary Examiner*—Floyd D. Higel

*Attorney, Agent, or Firm*—Connolly and Hutz

[57] ABSTRACT

Benzidine pigments are very effectively made by reducing certain azoxybenzenes with technical NaHS to form in good yield a corresponding hydrazobenzene which can be further reacted in crude condition to make the pigment.

4 Claims, No Drawings

PROCESS FOR MANUFACTURE OF BENZIDINE PIGMENTS

The present invention relates to the making of benzidine pigments.

Among the objects of the present invention is the provision of a novel process for inexpensively making benzidine pigments.

According to the present invention benzidine pigments are prepared from azoxybenzenes having the formula

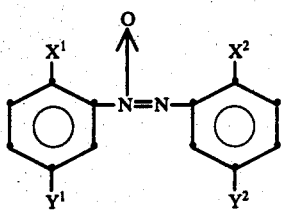

in which $X^1$, $X^2$, $Y^1$ and $Y^2$ are selected from the class consisting of hydrogen, chlorine, methyl, methoxy, ethoxy, sulfo and carboxyl.

The azoxybenzene is essentially completely reduced to the corresponding hydrazobenzene by technical NaHS in aqueous solution at a pH between about 8 and about 10, and at a temperature of 50° to 100° C, the solution is then cooled to precipitate out the hydrazobenzene the precipitated hydrazobenzene is filtered off, washed, and in the resulting crude condition subjected to benzidine rearrangement, diazotization and coupling.

It is preferred to carry out the reduction in an aqueous solution that contains water-miscible organic solvent that increases the solubility of the azoxybenzene in the hot reducing solution, but is essentially inert to the reactants. Examples of such organic solvents include lower alcohols having 1 to 4 carbon atoms, ethyleneglycol ethyleneglycol partially etherified so it has an ether group containing 1 to 4 carbons, dimethyl sulfoxide, dimethyl formamide and morpholine.

The crude hydrazobenzene is recovered from the reducing treatment in very good yields ranging from about 72 to about 88%, and is sufficiently pure that it can be directly converted to the final dye without further purification of the hydrazobenzene or the benzidine. The process of the present invention is accordingly well suited for commercial use to reduce the cost of manufacturing the benzidine dyes.

A feature of the present invention is that it is not even necessary to use a pure or even a carefully prepared NaHS reactant. The technical material available on the market does an admirable job of effecting the desired reduction and does so even if it contains large quantities of impurities such as sodium thiosulfate, an ingredient sometimes found in substantial quantities in technical NaHS.

On the other hand the presence of sodium thiosulfate or any of the other impurities normally found in technical NaHS is not needed for the purpose of the invention, and all types of technical grades of NaHS give substantially the same results. An excess of NaHS reagent should be used and the reaction mixture preferably tested to ascertain that essentially none of the unreduced material is present therein, before terminating the reducing step. One convenient way for making such a test on the reaction mixture is to ascertain the absence of starting azoxy derivative by thin layer chromatographic separation.

The crude hydrazobenzene is transformed into the desired product by first subjecting it to benzidine rearrangement as by means of a mineral acid such as aqueous HCl of 25 to 33% strength, preferably 30%, or $H_2SO_4$ of for example about 45% strength. More specific descriptions of such benzidine rearrangement are in "Methoden der organischen Chemie" (Houben-Weyl), 4th edition (1957), Georg Thieme Verlag, Stuttgart, Vol. XI/1, pages 839 to 848; and "Unit Processes in Organic Synthesis" by Ph. Groggins, 5th edition, McGraw-Hill Company, Inc., New York.

The benzidine derivatives formed can be diazotized without the intermediate isolation and purification and the coupling of the resulting tetrazo compounds is carried out in usual and known manner. See in this connecton "Farbenchemle" by H. E. Fierz-David and L. Blangley, 5th edition (1943), Springer Verlag Wien, pages 230 to 250, particularly pages 249/250 (diazotizing), and pages 250 to 281, particularly pages 270 to 281 (coupling).

As coupling components there can be used those of the acetoacetanilide, pyrazolone and 2,3-hydroxynaphthoic arylamide series usually applied in the manufacture of benzidine dyes, such as, for instance, acetoacetylaminobenzene, acetoacetylamino-2-methylbenzene, acetoacetylamino-2,4-dimethylbenzene, acetoacetylamino-4-methylbenzene, acetoacetylamino-4-chloro-2-methylbenzene, acetoacetylamino-2-methoxybenzene, acetoacetylamino-2,4-dimethoxybenzene, acetoacetylamino-2,5-dimethoxybenzene, acetoacetylamino-2,5-dimethoxy-4-chlorobenzene, acetoacetylamino-2-chlorobenzene, 1-phenyl-3-methyl-5-pyrazolone, 1-(4'-methyl)-phenyl-3-methyl-5-pyrazolone, 1-chlorophenyl-3-methyl-5-pyrazolone, 1-methoxyphenyl-3-methyl-5-pyrazolone, 1-phenyl-3-carbethoxy-5-pyrazolone, 2-hydroxy-3-naphthoic anilide and 2-hydroxy-3-naphthoic-o-anisidide.

The benzidine pigments are obtained according to the process of the present invention in a yield of about 86 to 90 percent of the theory, referred to the corresponding hydrazobenzene intermediate.

The followng examples serve to illustrate the invention but are not intended to limit it thereto, the designated parts being by weight unless otherwise noted.

EXAMPLE 1

85 Parts of an aqueous solution of technical grade sodium hydrosulfide (containing 35 percent NaHS and 12 percent $Na_2S_2O_3$) were slowly added over 90 minutes to a mixture of 53.4 parts of 2,2'-dichloroazoxybenzene in 133.5 parts of methanol at room temperature. Subsequently, the reaction mixture was refluxed at 70° C to 75° C for a period of 2½ hours. The pH of the reaction mixture was found to be between the values of 9 and 9.4 during this period. After this period a test showed the absence of the starting material, and the reaction mixture was cooled down to 0° C to 5° C to precipitate the hydrazobenzene, which was then filtered off and washed with water until alkali-free. After drying below 70° C, 40.3 parts of 2,2'-dichlorohydrazobenzene of a melting point of 85° C to 87° C, were obtained, this representing a yield of 80 percent of the theory.

The same result is achieved if isopropanol is used instead of methanol.

Also if there is used an aqueous solution of technical sodium hydrosulfide essentially free of sodium thiosulfate, and the sodium hydrosulfide is in the proportion of about 2.0 to 3.0 moles per mole 2,2'-dichloroazoxybenzene and is reacted as described above in this Example, practically the same result is achieved as to the yield and purity of the 2,2'-dichlorohydrazobenzene.

40 Parts of 2,2'-dichlorohydrazobenzene obtained as in Example 1 were added to 400 parts of hydrochloric acid of 30 percent strength at a temperature of 0° C to 5° C in 4 hours and then stirred at room temperature overnight. The temperature of the solution was then raised to 50° C in 5 hours, and the solution stirred for another 30 minutes at this temperature. Rearrangement to 3,3'-dichlorobenzidine was then complete, as shown by the absence of 2,2'-dichlorohydrazobenzene in the thin layer chromatographic separation of the reacton mixture.

The reaction mixture was accordingly cooled down by dilution with 2000 parts of ice water to 0° C to 5° C and diazotized with 20.5 parts of sodium nitrite. After 4 parts of charcoal had been added to the diazo liquid so prepared, the solution was clarified.

Separately a solution of 52.5 parts of acetoacetylaminobenzene in 230 parts of water and 36 parts of sodium hydroxide was charged with 56 parts of acetic acid and thereby adjusted to pH 5 to 6. The solution was cooled to 0° C to 5° C and charged with the aforesaid clarified diazo liquid while neutralizing the solution with aqueous acetate solution. Coupling was effected at pH 4 to 5. After completion of the coupling reaction the resulting precipitate was filtered off, washed with water and dried below 70° C. 88.5 Parts of Pigment Yellow 12 (C.I. 21090) representing a yield of 89 percent of the theory referred to the hydrazobenzene compound, were obtained as a greenish yellow powder with excellent application properties.

EXAMPLE 2

80.4 Parts of an aqueous solution of technical sodium hydrosulfide containing 35 percent NaHS and 8 percent $Na_2S_2O_3$, were added to a mixture comprising 53.4 parts of 2,2'-dichloroazoxybenzene in 130 parts of ethanol at room temperature. Subsequently, the reaction mixture was brought to 65° C within 1 hour and further refluxed at 75° C to 78° C for further 3 hours. During the heating the pH was kept in the range 9 to 9.4. The reaction mixture was then cooled down to 0° C to 5° C and the hydrazobenzene derivative filtered off and washed with water until alkali-free. After drying below 70° C, 37.3 parts of 2,2'-dichlorohydrazobenzene of melting point of 86° C were obtained, this representing a yield of 74 percent of the theory.

Practically the same yield and purity of 2,2'-dichlorohydrazobenzene is obtained when the technical NaHS is free of thiosulfate.

50.6 Parts of 2,2'-dichlorohydrazobenzene thus obtained were added to 190 parts of hydrochloric acid of 30 percent strength at a temperature of 0° C to 5° C in 4 hours. The reaction mixture was kept at this temperature for another 4 hours and then stirred at room temperature overnight. Subsequently, the temperature of the solution was raised to 50° C in 5 hours and stirred for another 30 minutes at this temperature. The foregoing test showed that the re-arrangement to 3,3'-dichlorobenzidine was completed. The reaction mixture was then cooled down with 3000 parts of ice water to 0° C to 5° C and diazotized with 26.2 parts of sodium nitrite. After the addition of 2 parts of charcoal to the diazo liquid so obtained, the solution was clarified by filtration.

In the meantime, a solution of 70.1 parts of acetoacet-O-toluidide in 700 parts of water and 25 parts of sodium hydroxide was charged with 40 parts of acetic acid. The pH was then adjusted to 5 to 6 with a solution of 160 parts of sodium hydroxide and 370 parts of glacial acetic acid in 500 parts of water. The final solution was cooled to 0° C to 5° C and charged to the aforesaid clarified diazo liquid. The pH-value during the resulting coupling was maintained at 4 to 5 by means of sodium acetate. After completion of the coupling, the reaction mixture was boiled for 1 to 1½ hours, thereafter filtered, the filtered off residue, washed with water and finally dried below 70° C. 115.6 parts of Pigment Yellow 14 (C.I. 21095) was obtained as a yellow powder with excellent application properties, this representing a yield of 88 percent of the theory referred to the hydrazobenzene compound.

In place of acetoacet-o-toluidide used in the above example, if one uses acetoacet-p-toluidide, one obtains Pigment Yellow 55 (C.I. 21096) in 86% of theory yield.

EXAMPLE 3

50.6 Parts of 2,2'-dichlorohydrazobenzene obtained according to Example 1 were added to 200 parts of hydrochloric acid of 30 percent strength at a temperature of 0° C to 5° C in 4 hours. The rearrangement of 3,3'-dichlorobenzidine was completed by stirring the solution at room temperature overnight and for 5 hours at 50° C. The reaction mixture was then cooled down with ice water to 0° C to 5° C and diazotized with 26.5 parts of sodium nitrite. After the addition of 2 parts of charcoal the diazo liquid was clarified.

A coupling solution of 78 parts of acetoacet-o-chloroanilide in 250 parts of water and 24 parts of caustic soda was charged with 37 parts of acetic acid and the pH adjusted to 5 to 6 by adding an aqueous solution of sodium acetate. The reaction mixture was cooled to 0° C to 5° C and charged to the aforesaid clarified diazo liquid. During the coupling a pH-value of 4 to 5 was maintained. After completion of the coupling the liquid was boiled for 1 hour, the formed pigment filtered, washed with water and dried below 70° C. There were obtained 124.5 parts of high quality Pigment Yellow 63 (C.I. 21091) as a yellow powder, this representing a yield of 89 percent of the theory referred to the hydrazobenzene compound.

Similarly by using, in place of acetoacet-o-chloroanilide used above, equivalent amount of acetoacet-o-anisidide, or acetoacetylamino-4-chloro-2,5-dimethoxybenzene, one obtains Pigment Yellow 17 (C.I. 21105), or Pigment Yellow 83 respectively. One can also employ equivalent amounts of acetoacetylamino-2,5-dimethoxybenzene in place of acetoacet-o-chloroanilide used above to get a reproducible grade of Yellow Pigment in very good yields.

EXAMPLE 4

50.6 parts of the crude 2,2'-dichlorohydrazobenzene of Example 1 were rearranged to 3,3'-dichlorobenzidine and then diazotized according to Example 1, 2400 parts of a clarified diazo liquid being obtained. Simultaneously, a coupling solution of 67.8 parts of 1-phenyl-3-methyl-5-pyrazolone were dissolved in 250 parts of water and 16.5 parts of sodium hydroxide. The coupling solution was cooled to 0° C to 5° C and then charged to the aforesaid clarified diazo liquid. After completion of the coupling the pigment formed was filtered, washed with water and finally dried below 70° C. 108.4 parts of Pigment Orange 13 (C.I. 21110) equal to 87 percent of the theory referred to the hydrazobenzene compound, were obtained as a reddish powder. The pigment had excellent application properties, the same as the pigment obtained by using commercially available 3,3'-dichlorobenzidine as starting material.

by using equivalent amounts of 1-phenyl-3-carbethoxy-5-pyrazolone in place of 1-phenyl-3-methyl-5-pyrazolone, coupled to the crude hydrazobenzene in the above example, one obtains Pigment Red 38 (C.I. 21120) in 89% yield and high purity.

EXAMPLE 5

50.6 parts of the crude 2,2'-dichlorohydrazobenzene of Example 1, were rearranged to 3,3'-dichlorobenzidine and then diazotized as described in Example 1, 2400 parts of a clarified diazo liquid being obtained.

At the same time, 72.7 parts of 1-p-tolyl-3-methyl-5-pyrazolone was dissolved in 300 parts of water and 20 parts of caustic soda. 5 parts activated carbon were added and the solution clarified by filtration. 32 parts of glacial acetic acid were next added to the solution, and the resulting liquid charged to the aforesaid diazo liquid maintaining a temperature between 5° C to 10° C. The pH-value at the end of the coupling should be acid to congo red.

After completion of the coupling the reaction mixture was boiled for 1hour, and the formed pigment filtered off and washed neutral with water. After drying at below 70° C, 114.5 parts of Pigment Orange 34 (C.I. 21115) were obtained, this representing a yield of 88 percent of the theory, referred to the hydrazobenzene compound.

EXAMPLE 6

90 parts of an aqueous solution of technical sodium hydrosulfide containing 35 percent NaHS and 4 percent $Na_2S_2O_3$ were added to a mixture comprising 51.6 parts of 2,2'-dimethoxyazoxybenzene in 155 parts methanol at room temperature within 5 hours. Subsequently, the reaction mixture was refluxed at 70° C to 75° C for 2½ hours while the pH was maintained between 8.5 and 9.4. After this period the absence of the starting material was confirmed and the reaction mixture was cooled down to 0° C to 5° C, the reduced product that precipitated filtered off and washed with water until alkali-free. After drying below 70° C, 35 parts of 2,2'-dimethoxyhydrazobenzene of a melting point of 100° C to 102° C were obtained, this representing a commercially acceptable grade in a yield of 72 percent of theory.

Practically the same results were achieved if there is used a corresponding amount of ethylene glycol instead of methanol.

If the sodium hydrosulfide solution contains no sodium thiosulfate, and the amount of sodium hydrosulfide applied is 3.0 moles per mole 2,2'-dimethoxyazoxybenzene, the reaction carried out otherwise as described in this Example produces practically the same yield and purity of the 2,2'-dimethoxyhydrazobenzene.

While as shown above it may be desirable to effect the NaHS reductions over very limited pH ranges that could be somewhat different for different azoxybenzenes, these reductions can take place at any pH within the range of from about 8 to about 10 without materially effecting the results.

50 Parts of crude 2,2'-dimethoxyhydrazobenzene thus obtained were added to 400 Parts of hydrochloric acid of 30 percent strength and rearranged to 3,3'-dimethoxybenzidine by stirring 18 hours at room temperature and 5 hours at 50° C. The reaction mixture was cooled down with 1000 parts of ice water and diazotized with 25.8 parts of sodium nitrite. After the addition of 2 parts of charcoal the diazo liquid was clarified.

Simultaneously, a coupling solution comprising 69.0 parts of 1-phenyl-3-methyl-5-pyrazolone, 48 parts of caustic soda and 250 parts of water was prepared, and this solution run into the aforesaid diazo liquid. After completion of the coupling, the reaction mixture was boiled for 1 hour, the pigment filtered off and washed neutral with water. After drying below 70° C, 109.5 parts equal to 87 percent of the theory of good quality Pigment Red 41 (C.I. 21200), referred to the hydrazobenzene compound, were obtained as a reddish powder.

By using equivalent amounts of 1-p-toly-3-methyl-5-pyrazolone, or 1-phenyl-3-carbethoxy-5-pyrazolone in place of 1-phenyl-3-methyl-5pyrazolone used in the above Example, one obtains Pigment Red 37 or Pigment Red 42 respectively in excellent yields and grades.

EXAMPLE 7

85 Parts of an aqueous solution of technical sodium hydrosulfide containing 35 percent NaHS and 6.5 percent $Na_2S_2O_3$ were added to a mixture comprising 67.2 parts of 2,2', 5,5'-tetrachloroazoxybenzene in 226 parts of methanol at room temperature. Subsequently, the reaction mixture was refluxed at 70° C for 2 hours during which the pH was kept at 9.0. The reaction mixture was then cooled down gradually to 2° C to 5° C and the resulting precipitate filtered off and washed with water until alkali-free. After drying below 70° C, 48 parts of 2,2', 5,5'-tetrachlorohydrazobenzene of a melting point of 123° C to 125° C were obtained, this representing a yield of 75 percent of the theory and a good purity.

If the sodium hydrosulfide solution contains no sodium thiosulfate, and the sodium hydrosulfide is applied in a ratio of 2.0 moles per mole 2,2', 5,5'-tetrachloroazoxybenzene, the reaction carried out otherwise as described in this Example provided practically the same result as to the yield and purity of the 2,2', 5,5'-tetrachlorohydrazobenzene.

64.4 parts of the 2,2', 5,5'-tetrachlorohydrazobenzene were added to 640 parts of hydrochloric acid of 30 percent strength. The reaction mixture was refluxed for 7 to 8 hours, allowed to cool down to room temperature and further cooled down to 0° C to 5° C by adding 1000 parts of ice water. To this solution 83.2 parts of an aqueous solution of sodium nitrite of 30 percent strength were added. After completion of the diazotization and the addition of 5 parts of charcoal, the diazo liquid was clarified.

At the same time, 74.0 parts of acetoacet-m-xylidide were dissolved in 700 parts of water and 25 parts of caustic soda. The solution was cooled down to 0° C by adding ice, charged with 50.6 parts of acetic acid, and the pH adjusted with aqueous sodium acetate to 5 to 6. The reaction mixture was now charged to the aforesaid diazo liquid. During the couplng a pH-value of 4 to 5 was maintained.

After completion of the coupling, the reaction mixture was boiled for 1 hour and filtered. The resulting press cake was washed neutral with water. After drying below 70° C, 129.5 parts of Pigment Yellow 81 representing 86 percent yield of the theory referred to the hydrazobenzene compound, were obtained as a greenish yellow powder. The thus obtained pigment had the same excellent application properties as the pigment prepared from a commercial pure 3,3', 6,6'-tetrachlorobenzidine.

Similarly by employing an equivalnt amount of acetoacet-4-chloro-2-methyl-anilide in place of acetoacet-m-xylidide one can obtain Pigment Yellow 113 in 88% yield.

EXAMPLE 8

85 Parts of an aqueous solution of technical sodium hydrosulfide containing 35 percent NaHS and 9 percent $Na_2S_2O_3$ were added to a mixture comprising 65.4 parts of 2,2'-dichlor-5,5'-dichloroazoxybenzene in 196 parts of methanol at room temperature within 90 minutes. The reaction mixture was then refluxed at 70° C to 75° C for a period of 5 hours. The pH had been kept between 9 and 9.4. After this period the starting azoxybenzene was shown to be all consumed and the reaction mixture was cooled down to 0° C to 5° C, and the resulting precipitate filtered off and washed with water until alkali-free. After drying below 70° C 48 parts of 2,2'-dichloro,-5,5'-dichlorohydrazobenzene of a melting point of 116° C were obtained, this representing yield of 76 percent of the theory.

The reduction is performed with practically the same result if there is applied a corresponding amount of ethyleneglycol monoethyl ether instead of the methanol, or if the NaHS solution is free of thiosulfate.

64.4 Parts of crude 2,2'-dimethoxy-5,5'-dichlorohydrazobenzene thus obtained were added to 640 parts of hydrochloric acid of 30 percent strength and the reaction mixture refluxed for 8 hours. At this point the re-arrangement to 2,2'-dichloro-5,5'-dimethoxybenzidine was complete and the reaction mixture was then cooled down with ice water to 0° C to 5° C, and then diazotized with 90 parts of an aqueous sodium nitrite solution of 30 percent strength. After the addition of 5 parts of charcoal the diazo liquid was clarified.

At the same time, 76.6 parts of acetoacet-m-xylidide were dissolved in 760 parts of water and 28 parts of caustic soda. The solution was cooled down to 0° C, charged with 51.6 parts of glacial acetic acid and the pH-value adjusted to 5 to 6 by adding an aqueous sodium acetate solution. To this solution the aforesaid diazo liquid was added maintaining a pH-value of 4 to 5. After the coupling, the reaction mass was stirred for another 30 minutes and then boiled for 1 to 1½ hours. The pigment that precipitated was filtered off and washed neutral with water. After drying at 70° C, 131.5 parts of Pigment Yellow 15 (C.I. 21220) equal to 86 percent of the theory, referred to the hydrazobenzene compound, were obtained as a yellow powder of very good purity.

EXAMPLE 9

90 Parts of an aqueous solution of technical sodium hydrosulfide (35 percent NaHS, 10 percent $Na_2S_2O_3$) were added to a mixture of 45.2 parts of 2,2'-dimethylazoxybenzene in 150 parts methanol at 70° C to 75° C. Subsequently, the reaction mixture was refluxed at 75° C for 4 hours with pH kept between 9 and 9.4. Thereafter, the reaction mixture was cooled down to 0° C to 5° C, and the resulting precipitate filtered off and washed with water until alkali-free. The press-cake was dried below 70° C. There were obtained 35.6 parts of 2,2'-dimethylhydrazobenzene of a melting point of 162° C to 164° C, this representing a yield of 84 percent of the theory, of acceptable purity.

48 Parts of crude 2,2'-dimethylhydrazobenzene thus obtained were added to 250 parts of hydrochloric acid of 30 percent strength at 0° C to 5° C. The re-arrangement to 3,3'-dimethylbenzidine was completed by stirring at room temperature overnight and for additional 5 hours at 50° C. The reaction mixture was then cooled down by adding 2000 parts of ice water and diazotized with 30 parts of sodium nitrite. After the addition of 4 parts of charcoal to the diazo liquid, the solution was clarified.

A solution of 72.3 parts of acetoacetanilide in 500 parts of water and 27.5 parts of caustic soda was separately charged with 40 parts of glacial acetic acid. The resulting solution was cooled down to 0° C to 5° C and the pH adjusted to 5 to 6 by adding an aqueous sodium acetate solution. The aforesaid clarified diazo liquid was then charged to it and a pH of 4 to 5 was maintained. After completion of the coupling the reaction mixture was boiled for 1 ½ hours, filtered and the filtered off residue washed neutral with water. After drying below 70° C, 117.0 parts of Pigment Orange 15 (C.I. 21130) equal to 88 percent of the theory, referred to the hydrazobenzene compound, was obtained as a pure reddish powder.

Similarly by using equivalent amount of acetoacet-m-xylidide in place of acetoacetanilide used in the above Example one obtains a correspondingly pure Yellow Pigment in 87% yield.

EXAMPLE 10

82 Parts of an aqueous solution of 35 percent technical sodium hydrosulphide, free from sodium thiosulphate, were added to a mixture of 53.4 parts of 2,2'-dichloroazoxybenzene in 99 parts of dimethyl formamide at 60° C–65° C within one hour. Subsequently, the reaction mixture temperature was raised to 75° C and maintained at 70° C–75° C for 3 hours. The pH of the reaction mixture was held between 9.5 and 10.0. After this period, the starting material had been all consumed. Then the reaction mixture was cooled down to 0° C, the thus separated product was filtered off and washed with water until alkali-free. After drying below 70°, 44.6 parts of commercial grade 2,2'-dichlorohydrazobenzene of a melting point of 85° C were obtained, this representing a yield of 88 percent of the theory.

Similar result is achieved if there is employed the same amount of dimethyl sulfoxide instead of dimethyl formamide in the Example described above.

If there are used in place of 2,2'-dichloroazoxybenzene, equivalent amounts of the other azoxybenzenes described above and the reactions are carried out otherwise as described in this Example with either dimethyl formamide or dimethyl sulfoxide, one obtains the corresponding hydrazobenzene derivatives in yields of 72–88% of the theory, in purities sufficiently good enough for direct conversion to the appropriate pigments.

EXAMPLE 11

84 Parts of an aqueous solution of technical sodium hydrosulfide, free from sodium thiosulphate, were added to a mixture comprising 53.4 parts of 2,2'-dichloroazoxybenzene in 140 parts of morpholine at 60° C – 65° C within 90 minutes. Subsequently, the reaction temperature was raised to 75° C and maintained at that temperature for 2 ½ hours. Next the temperature was further raised to 90° C and maintained at that temperature for 1 hour. The pH of the reaction mixture varied between 9.5 to 10. After this period the absence of the starting material was confirmed. Then the reaction mixture was cooled to 20° C and neutralized cautiously with 400 parts of hydrochloric acid of 15 percent strength at a temperature below 20° C. Then the reaction mixture was cooled to 0° C to 5° C, and the resulting precipiatate filtered off and washed with water until free of chloride. After drying below 70° C, 40.1 parts of 2,2'-dichlorohydrazobenzene of a melting point of 85° C to 87° C were obtained, this representing a yield of 79 percent of the theory.

The hydraziobenzene obtained as described above is also sufficiently pure for conversion to pigments as described in any one of the foregoing Examples 1 to 5.

If there are used equivalent amounts of 2,2'-dimethoxyazoxybenzene, or 2,2', 5,5'-tetrachloroazoxybenzene, or 2,2'-dichloro-5,5'-dimethoxyazoxybenzene, or 2,2'-dicarboxyazoxybenzene, or 3,3'-disulfoazoxybenzene instead of 2,2'-dichloroazoxybenzene used in the above example and the reaction is carried out otherwise as described in this Example, one obtains the corresponding hydrazobenzene in a yield of 72–88 percent of the theory.

The hydrazobenzene derivatives so obtained are sufficiently pure for conversion to appropriate pigments according to the processes as described in Examples 1 to 9.

EXAMPLE 12

85 Parts of an aqueous solution of 36 percent technical sodium hydrosulphide, containing 1 percent sodium thiosulphate, were added to a mixture comprising 51.6 parts of 2,2'-dimethoxy azoxybenzene in 100 parts dimethyl sulfoxide at 60° within one hour. Subsequently, the temperature of the reaction mixture was raised to 75° C and maintained at 70° C–75° C for 2 ½ hours. The pH of the reaction mixture was maintained between 9.5 and 10.0. After this period the starting material was shown to be entirely reduced. Then the reaction mixture was cooled down to 0° C, the separated product was filtered off and washed with water until alkali-free. After drying below 70° C, 43.0 parts of high quality 2,2'-dimethoxyhydrazobenzene of a melting point of 100° C to 102° C were obtained, this repesenting a yield of 88 percent of the theory.

Practically the same result is obtained if there is used the same amount of dimethyl formamide instead of dimethyl sulfoxide in the Example described above.

Crude 2,2'-dimethoxyhydrazobenzene obtained by either of the above two methods can be converted to the Pigment Reds 37, 41 and 42 according to the procedure described in Example 6 in 87–90 percent yields.

EXAMPLE 13

50 Parts of crude 2,2'-dimethoxyhydrazobenzene prepared as described in Example 6 were rearranged to 3,3'-dimethoxybenzidine and then diazotized as described in Example 6, and a clarified diazo solution was prepared.

At the same time, 96.8 parts of 2-hydroxy-3-naphthoic anilide was dissolved in 1000 parts of water and 76 parts of caustic soda. 3 parts of activated carbon were added and the solution clarified. This solution was run into a mixture of 400 parts of water and 120 parts of acetic acid and sufficient ice, so that precipitation occured at 0° C –5° C and the pH was adjusted to 5 to 6 by adding, if necessary, an aqueous sodium acetate solution. To this resulting mixture, the aforesaid diazo liquid was added in two hours, maintaning a pH value of 4.5–5.5. After the coupling, the reaction mass was stirred for another one hour, filtered and the product washed neutral with water. After drying below 70° C, 146 parts of high quality Pigment Blue 25 (C.I. 21180), equal to 89.5 percent of the theory, referred to the hydrazobenzene compound, was obtained.

Similarly, by using equivalent amount of 2-hydroxy-3-naphthoic anisidide in place of 2-hydroxy-3-naphthoic anilide used in the above Example, one obtains good quality Pigment Blue 26 (C.I. 21185) in 87% yield.

Other azoxybenzenes suitable for reduction pursuant to the process of the process of the present invention are 2,2'-disulfo-5,5'-dicarboxy azoxybenzene 2,2'-diethoxy azoxybenzene 2,2'-dimethyl-5,5'-disulfo azoxybenzene mixed azoxybenzenes resulting from the prior reduction of a mixture of ortho nitrobenzoic acid and nitrobenzene.

The presence of two or more sulfo groups in the azoxybenzene molecule makes it practical to use water as the only solvent for the NaHS reduction step of the present invention. The presence of one sulfo group or of one or more carboxy groups in that molecule enables the use of less organic solvent in that step than is exemplified above.

In general the NaHS concentration in the reducing solution should be at least 5 weight percent, preferably 10 weight percent, of the total solution. The total quantity of NaHS should be at least 2 mols for every mol of the azoxybenzene.

Obviously many modifications and variations of the present invention are possible in the light of the above teachings. It is, therefore, to be understood that within the scope of the appended claims the invention may be practised otherwise than as specifically described.

What is claimed is:

1. In the process of making a benzidine pigment by reducing an azoxybenzene to a hydrazobenzene, then subjecting the hydrazobenzene to benzidine rearrangement, diazotizing the resulting benzidine and coupling it to a benzidine pigment coupling component, the improvement according to which the azoxybenzene has the formula

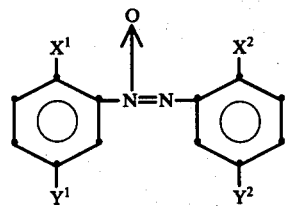

in which $X^1$, $X^2$, $Y^1$ and $Y^2$ are selected from the class consisting of hydrogen, chlorine, methyl, methoxy, ethoxy, sulfo and carboxyl, and the reduction to the corresponding hydrazobenzene is effected by technical NaHS in aqueous solution at a pH between about 8 and about 10, and at a temperature of 50° to 100° C, the solution is then cooled to precipitate out the hydrazobenzene, the precipitated hydrazobenzene is filtered off, washed, and in the resulting crude condition subjected to the benzidine rearrangement.

2. In the process of making a benzidine pigment, the improvement according to which an azoxybenzene having the formula

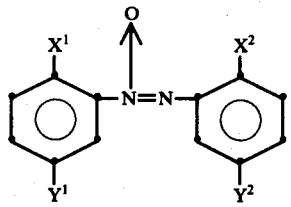

in which $X^1$, $X^2$, $Y^1$ and $Y^2$ are selected from the class consisting of hydrogen, chlorine, methyl, methoxy, ethoxy, sulfo and carboxy, is essentially completely reduced to the corresponding hydrazobenzene by technical NaHS in aqueous solution at a pH between about 8 and about 10, and at a temperature of 50° to 100° C, the solution is then cooled to precipitate out the hydrazobenzene derivative, the precipitated hydrazobenzene derivative is filtered off and the filtered off hydrazobenzene is washed to produce in good yield crude dye intermediate suitable without further purification for processing into the final pigment.

3. In the process of making a benzidine pigment by reducing an azoxybenzene to a hydrazobenzene in an aqueous solution containing water-miscible organic solvent that increases the solubility of the azoxybenzene in the solution but is otherwise inert, and then subjecting the hydrazobenzene to a benzidine rearrangement, diazotizing the resulting benzidine and coupling it to a benzidine pigment coupling component, the improvement according to which the azoxybenzene has the formula

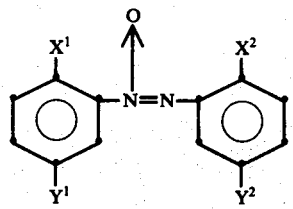

in which $X^1$, $X^2$, $Y^1$ and $Y^2$ are selected from the class consisting of hydrogen, chlorine, methyl, methoxy, ethoxy, sulfo and carboxyl, and the reduction to the corresponding hydrazobenzene is effected by technical NaHS in aqueous solution at a pH between about 8 and about 10, and at a temperature of 50° to 100° C, the solution is then cooled to precipitate out the hydrazobenzene, the precipitated hydrazobenzene is filtered off, washed, and in the resulting crude condition subjected to the benzidine rearrangement.

4. The combination of claim 3 in which the organic solvent is selected from the class consisting of lower alkanols, ethylene glycol, ethylene glycol partly etherified so that it has an ether group containing 1 to 4 carbons, dimethyl sulfoxide, dimethyl formamide and morpholine.

* * * * *